US011664762B2

(12) United States Patent
Mangual Corujo et al.

(10) Patent No.: US 11,664,762 B2
(45) Date of Patent: May 30, 2023

(54) SUPPORTING BASE FOR TILTING SOLAR PANELS INTO A VERTICAL POSITION

(71) Applicant: KEVA LLC, San Juan, PR (US)

(72) Inventors: Hector Miguel Mangual Corujo, Aguas Buenas, PR (US); Rene Antonio Tamayo Villafuerte, San Juan, PR (US)

( * ) Notice: Subject to any disclaimer, the term of this patent is extended or adjusted under 35 U.S.C. 154(b) by 0 days.

(21) Appl. No.: 17/940,808

(22) Filed: Sep. 8, 2022

(65) Prior Publication Data
US 2023/0077231 A1 Mar. 9, 2023

Related U.S. Application Data

(60) Provisional application No. 63/241,634, filed on Sep. 8, 2021.

(51) Int. Cl.
*H02S 20/30* (2014.01)
*F16M 11/20* (2006.01)

(52) U.S. Cl.
CPC ......... *H02S 20/30* (2014.12); *F16M 11/2021* (2013.01)

(58) Field of Classification Search
CPC ....................................................... H02S 20/30
See application file for complete search history.

(56) References Cited

U.S. PATENT DOCUMENTS

2018/0302023 A1 * 10/2018 Tanaka ................. F24S 30/425

* cited by examiner

*Primary Examiner* — Jayne L Mershon
(74) *Attorney, Agent, or Firm* — Eugenio J. Torres-Oyola; Victor M. Rodriguez-Reyes; Rafael Rodriguez-Muriel

(57) ABSTRACT

A solar panel supporting base or structure configured to allow one or more predominantly horizontal solar panels to be lifted or tilted to a vertical position, thereby facilitating maintenance or cleaning of the solar panel or underlying surface.

5 Claims, 6 Drawing Sheets

SUPPORTING BASE FOR TILTING SOLAR PANELS INTO A VERTICAL POSITION

RELATED APPLICATIONS

This application is a non-provisional application of, and claims priority under 35 U.S.C. § 119(e) to, U.S. Provisional Application No. 63/241,634, filed Sep. 8, 2021, and entitled "Supporting Base for Tilting Solar Panels Into a Vertical Position", the entire contents of which are incorporated by reference.

STATEMENT REGARDING FEDERALLY SPONSORED RESEARCH AND DEVELOPMENT

N/A

BACKGROUND OF THE DISCLOSURE

Field of the Invention

The present application relates to a base for mounting one or more solar panels, wherein said base is configured to allow the solar panels to be lifted and tilted from a predominantly horizontal position into a vertical position.

Background

Proper maintenance of solar panels presents many challenges. These panels often withstand harsh outdoor conditions and as such, are prone to damage, deterioration, loose parts; or simply becoming dirty. Standard solar panels consist of a base that secures the panels to a rooftop or floor in a fixed and predominantly horizontal position. Since they are fixed to the floor or rooftop, it is difficult to access the bottom portion of the panels or the floor beneath the panels (which is also prone to get dirty and its deterioration can cause leaks). As such, traditional solar panels, taking into account their fixed nature, are extremely difficult to clean, repair or provide maintenance to. Accordingly, there is a need for a solar panel with a supporting base that allows the solar panel to be lifted or tilted into a vertical position, thereby facilitating maintenance or repair of the solar panel or the floor beneath the panel.

While certain aspects of conventional technologies have been discussed to facilitate disclosure of the invention, Applicant in no way disclaims these technical aspects, and it is contemplated that the claimed invention may encompass one or more of the conventional technical aspects discussed herein. In this specification where a document, act, or item of knowledge is referred to or discussed, this reference or discussion is not an admission that the document, act, or item of knowledge or any combination thereof was at the priority date, publicly available, known to the public, part of common general knowledge, or otherwise constitutes prior art under the applicable statutory provision; or is known to be relevant to an attempt to solve any problem with which this specification is concerned.

SUMMARY OF THE DISCLOSURE

The present disclosure relates to a solar panel supporting base or structure configured to allow one or more predominantly horizontal solar panels to be lifted or tilted to a vertical position, thus facilitating maintenance or cleaning of the solar panel o underlying surface. In a predominantly horizontal position, the panels are supported by two arrangements made up of two or more perpendicular legs and a horizontal longitudinal beam, wherein one of the arrangements is taller than the other. One end of the supporting base or structure is fastened to the shorter arrangement via a hinge, while the other end is resting on the taller arrangement. When the end of the supporting base resting on the taller arrangement is lifted, the hinge on the other end rotates around the hinge pivot, causing the panels to move from a horizontal position to a vertical position. The supporting base includes a first arm or bar that provides support to the structure in the vertical position. A primary end of the first arm is fastened to the structure whereas a mid-point of the arm is fastened to a second arm or bar, which in turn is fastened to the horizontal longitudinal beam, to provide greater stability. Movement of the solar panel to the vertical position causes a secondary end of the first arm to meet the surface, thus providing support to the solar panel in the vertical position.

The present disclosure may address one or more of the problems and deficiencies of the prior art discussed above. However, it is contemplated that the disclosure may prove useful in addressing other problems and deficiencies in a number of technical areas. Therefore, the claimed invention should not necessarily be construed as limited to addressing any of the particular problems or deficiencies discussed herein.

BRIEF DESCRIPTION OF THE DRAWINGS

These and other features, aspects, and advantages of the present invention will become better understood with regard to the following description, appended claims and accompanying drawings where:

DETAILED DESCRIPTION OF THE DISCLOSURE

Figure 1:
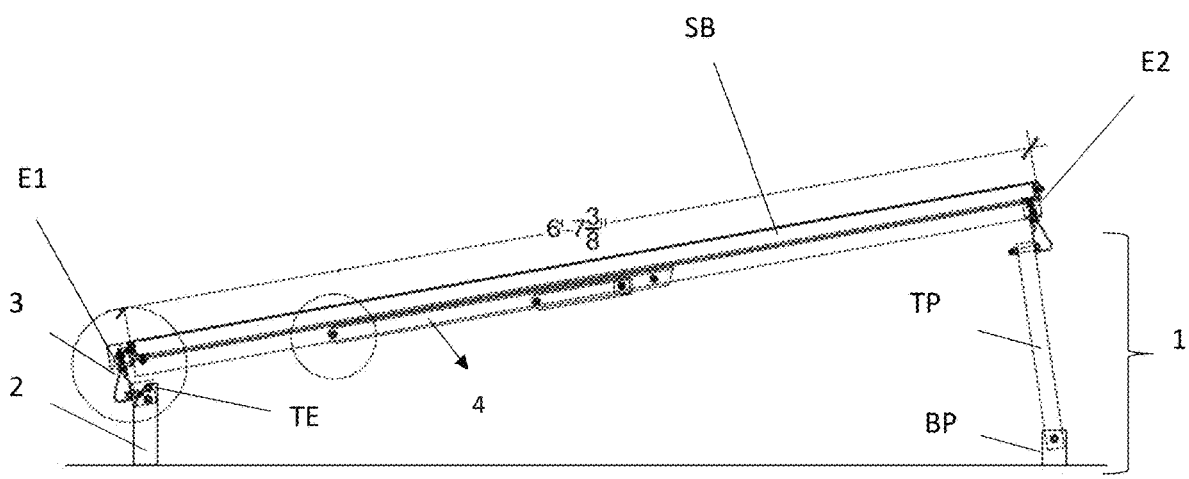
FIG. 1 shows a side view of the solar panel base or structure in its closed position, in accordance with principles of the present disclosure.

In the Summary above, the Description below, and in the accompanying drawings, reference is made to particular features of the present disclosure. It is to be understood that the disclosure includes possible combinations of such particular features. For example, where a particular feature is disclosed in the context of a particular aspect or exemplary embodiment, or a particular claim, that feature can also be used, to the extent possible, in combination with and/or in the context of other particular aspects and exemplary embodiments, and in the invention generally.

The term "comprises" and grammatical equivalents thereof are used herein to mean that other components, structures, steps, etc. are optionally present. For example, an article "comprising" (or "which comprises") components A, B, and C can consist of (i.e., contain only) components A, B, and C, or can contain not only components A, B, and C, but also one or more other components or structures.

The term "at least" followed by a number is used herein to denote the start of a range beginning with that number (which may be a range having an upper limit or no upper limit, depending on the variable being defined). For example, "at least 1" means 1 and/or more than 1.

The term "mechanical features" or "mechanical coupled" is used herein to mean features of a component, mechanical or geometric, which have a functional purpose of attaching or linking that component to one or more other components with compatible or corresponding mechanical features. An example of a mechanical feature is a slot in a component, where said slot is designed to accept a tab from another component and the union of the slot and tab from the two components effectively links, attaches, fixes, and/or locks the components together. The term "mechanical features" refers to, but is not limited to: clips, hooks, hook and loop fasteners, slot and tabs, all male and female fasteners, screws, bolts, nuts, holes that have been tapped, latches, pins, etc.

While the specification will conclude defining the features of exemplary embodiments of the disclosure that are regarded as novel, it is believed that the disclosure will be better understood from a consideration of the following description in conjunction with the figures, in which like reference numerals are carried forward.

Figure 6:
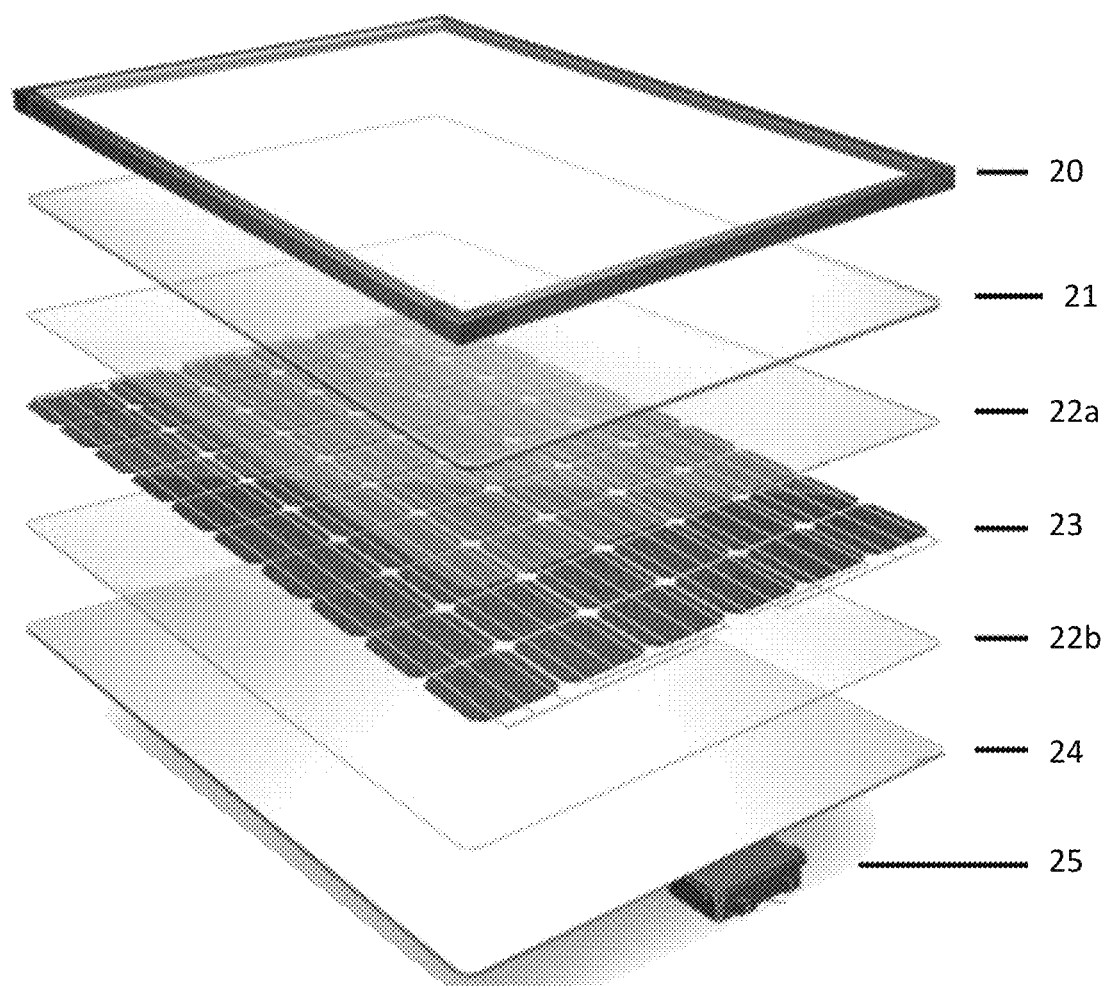
FIG. 6 shows an exploded view of the components of a solar panel, in accordance with principles of the present disclosure.

As shown in FIG. 6, a solar panel comprises a frame 20 (preferably made of aluminum), tempered glass 21, one or more encapsulants 22a, 22b, solar photovoltaic cells 23, a back sheet 24, and a junction box 25. The purpose of the solar photovoltaic cells 23 ("PV cells") is to convert sunlight directly into DC electrical energy. The purpose of the tempered glass 21, on the other hand, is to protect the PV cells from the weather. The glass is typically high strength tempered that is designed to resist mechanical loads and extreme temperature changes. Moreover, the purpose of the frame 20 is to provide protection and to serve as a solid structure to mount the solar panel in position.

The encapsulants 22a, 22b, on the other hand, are a layer that is usually made with ethylene vinyl acetate, which is a specially designed polymer highly transparent (plastic) layer used to encapsulate the cells and hold them in position. The encapsulants 22a, 22b provide some shock absorption and helps protect the PV cells and interconnecting wires from vibrations and/or the weather. The back sheet 24, in turn, acts as a moisture barrier and final external skin to provide both mechanical protection and electrical insulation. Lastly, the junction box 25 refers to a small weatherproof enclosure located on the rear side of the panel that is needed to securely attach the cables required to interconnect the panels.

All standard installations of solar panels use as support an arrangement formed by two or more vertical legs and a horizontal longitudinal beam, placed at the shorter end of the supporting base to fasten the hinges of the supporting structure and on the other end a taller version of the arrangement that serves as a second support of the structure.

FIGS. 1-5 show a solar panel supporting base or structure SB configured to allow one or more predominantly horizontal solar panels to be lifted or tilted to a vertical position, thereby facilitating maintenance or cleaning of the solar panel or underlying surface. When the supporting base SB is holding the one or more solar panels in a predominantly horizontal position (or closed position), the panels are supported by an arrangement formed by at least two perpendicular legs or supporting members 1, 2, and one or more horizontal longitudinal beams E1 and E2 wherein the first supporting member 1 is taller than the second supporting member 2, as shown in FIG. 1. The first supporting member 1 is further subdivided into a top portion TP and a bottom portion BP. The bottom portion BP of the first supporting member 1 is secured or drilled to the ground or surface; while one end of the top portion TP is secured to the bottom portion BP via one or more screws or fasteners. As such, the first supporting member 1 comprises two portions TP, BP that are independent of each other. It should be noted that the top portion TP is slightly slanted in relation to the bottom portion BP in order to provide a more efficient connection with one of the horizontal longitudinal beam E2. The second supporting member 2, on the other hand, is a single structure having a top end TE and a bottom end BE, wherein the bottom end is secured or drilled to the ground or surface. Notwithstanding the foregoing, the first supporting 1 member can also be a single structure that is not subdivided into independent top and bottom portions.

Figure 3:
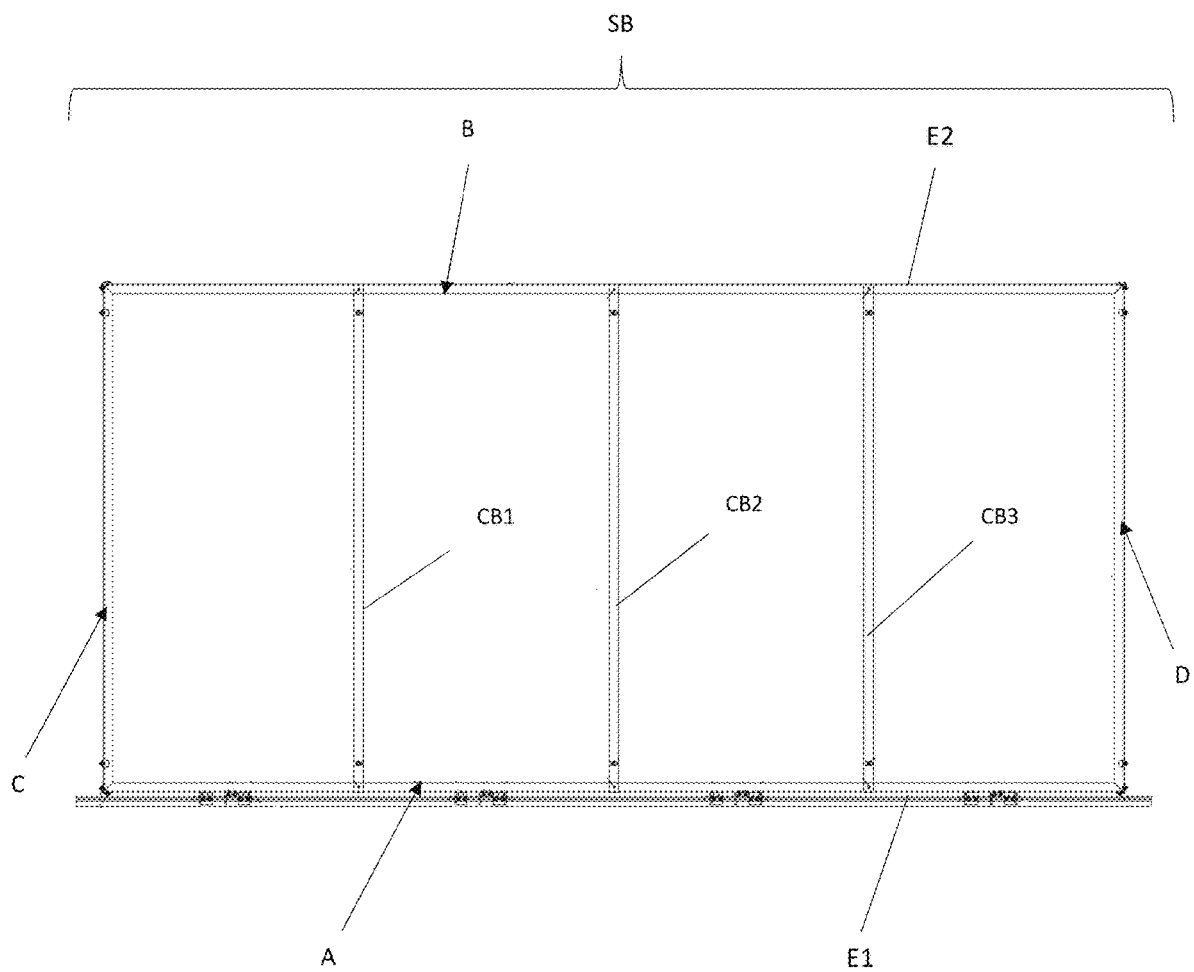
FIG. 3 shows a top view of the solar panel base or structure in its closed position, in accordance with principles of the present disclosure.
Figure 4:
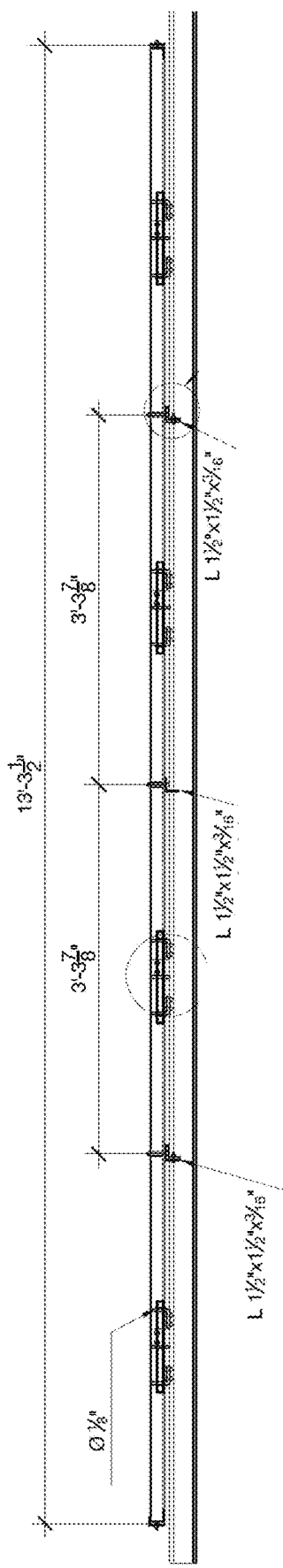
FIG. 4 shows a frontal view of the solar panel base or structure, in accordance with principles of the present disclosure.
Figure 5:
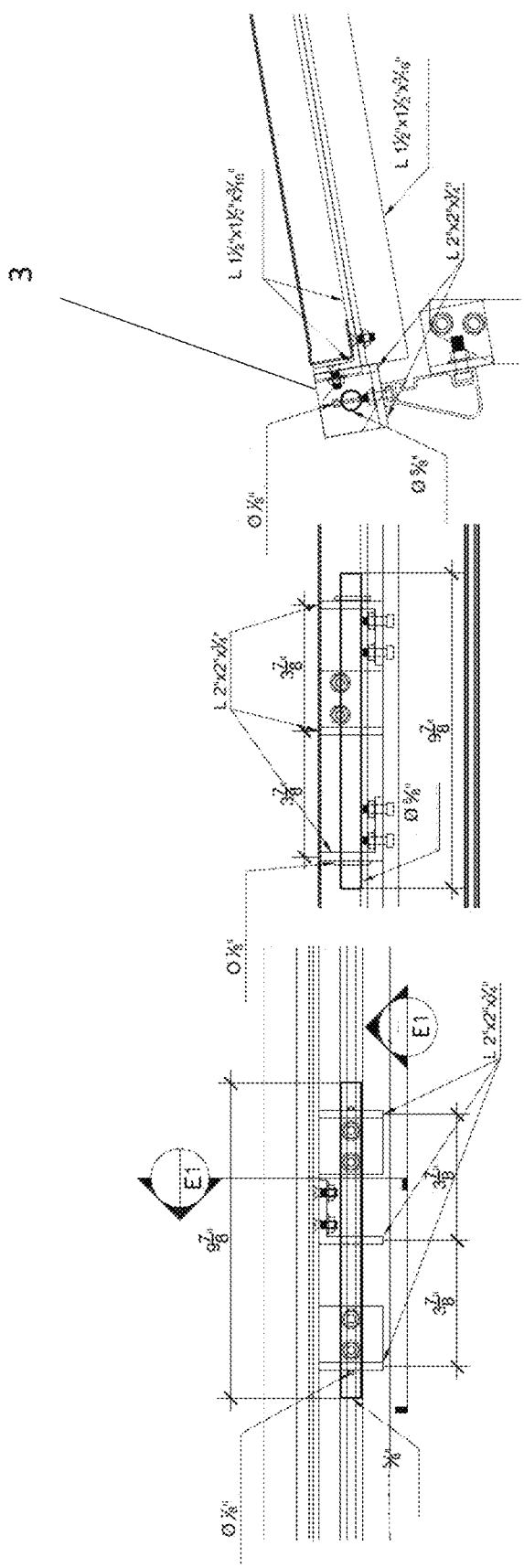
FIG. 5 show an expanded side view of the hinge component of the solar panel base or structure, in accordance with principles of the present disclosure.

The supporting base SB is also the structure that holds the one or more solar panels in place. As shown in FIG. 3, the supporting base SB should preferably include four angular sections A, B, C, D, separated by a plurality of central angular sections or beams CB1-CB3, capable of holding up to four solar panels. It should be noted that each of the angular sections A, B, C, D, includes a first end and a second end. As shown in FIG. 3, the first angular section A and the second angular section B are opposite to each other; and a first end of the third angular section C is perpendicularly connected to a first end of the first angular section A; and a second end of the third angular section C is perpendicularly connected to a first end of the second angular section B. Similarly, a first end of the fourth angular section D is perpendicularly connected to a second end of the first angular section A; and a second end of the fourth angular section D is perpendicularly connected to a second end of the second angular section B. Moreover, each of the plurality of central angular sections or beams CB1-CB3 includes opposing ends that perpendicularly intersect with the angular sections A and B. It should be noted that the different sections of the supporting base SB disclosed herein (the angular sections A, B, C, D, and the plurality of central angular sections or beams CB1-CB3) are bolted or fastened to thereto via one or more bolts or fasteners.

Figure 2:
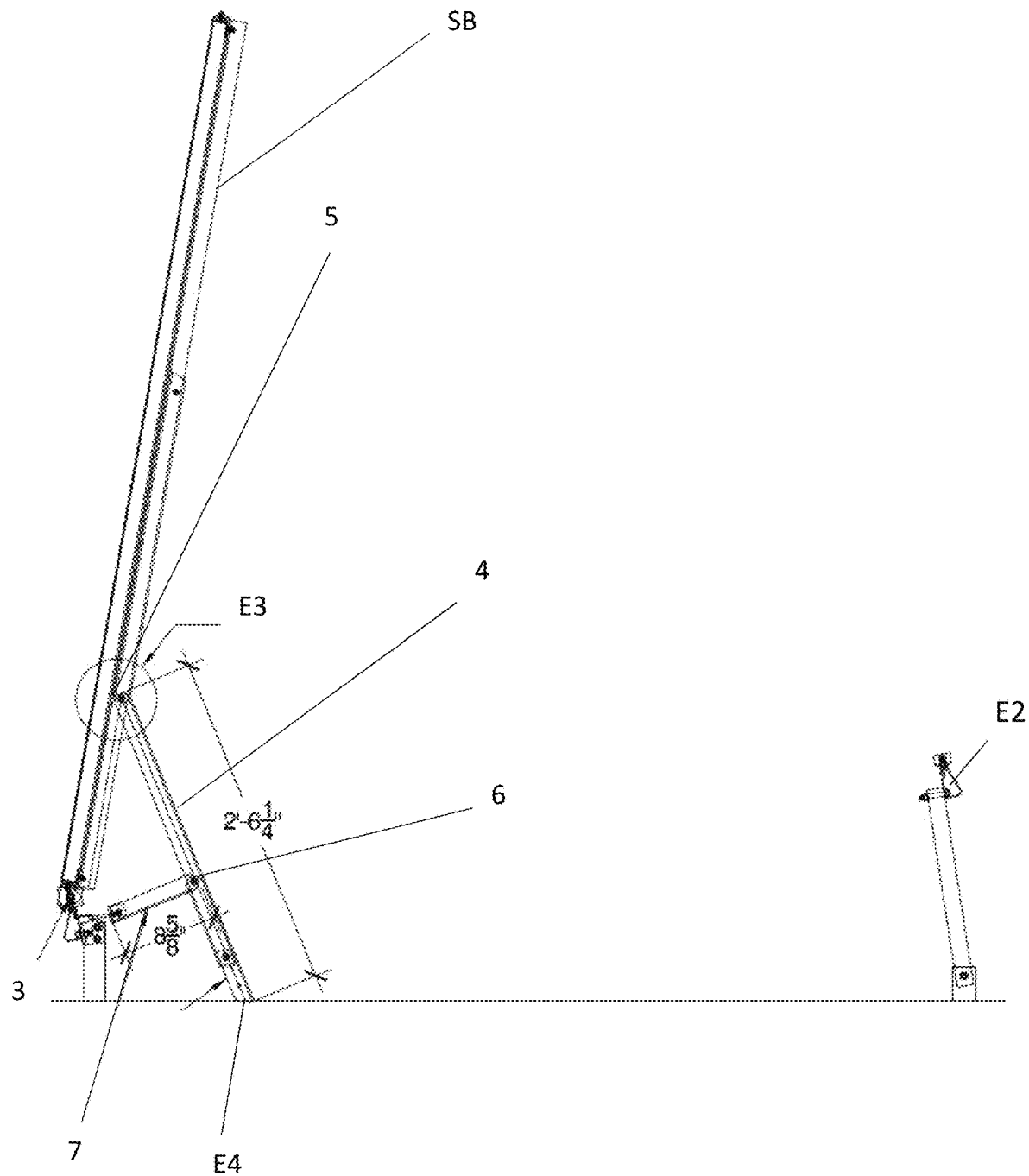
FIG. 2 shows a side view of the solar panel base or structure in its open position, in accordance with principles of the present disclosure.

As shown in FIG. 1, the supporting base SB is supported by the first horizontal longitudinal beam E1, which is fastened or connected to a top end TE of the second supporting member 2 via one or more hinges 3; and by the second horizontal longitudinal beam E2, which adapted to be fastened or lie resting on the top portion TP of the taller first supporting member 1. In some embodiments, however, the second horizontal longitudinal beam E2 can also be fastened or secured to the first supporting member 1. The one or more hinges 3 (shown in FIG. 5) refer to a structure that connects two objects (in this case, the base support SB with the first horizontal longitudinal beam E1) via one or more bolts allowing an angle of rotation between the two objects. The one or more hinges 3 comprise two independent structures joined together via a pin. Whenever the base support SB that is resting on the second horizontal beam E2 is lifted, the one or more hinges 3 on the first horizontal longitudinal beam E1 rotate around a pivot or pin, causing the supporting base SB, and consequently the corresponding solar panels attached or fastened to it, to move from a predominantly horizontal position to a vertical position (as shown in FIG. 2), thereby providing access to the area beneath the solar panel and facilitating the maintenance, repair, or cleaning of the solar panel or surface beneath the solar panel. It should be noted that the supporting base or structure SB can be used on new solar panel installation projects; or be added to existing solar panels.

As previously noted, the supporting base SB includes one or more central angular sections CB1-CB3, that connect the first angular section A with its second angular section B, as shown in FIG. 3. At least one of the central angular sections CB1-CB3 includes a first arm or bar 4 rotatably connected thereto. The purpose of the first arm or bar 4 is to provide support to the supporting base SB and corresponding solar panels in the vertical position, as shown in FIG. 2. A first end E3 of the first arm 4 is rotatably fastened or connected, via one or more screws 5, to the one or more of the central angular sections CB1-CB3, on the supporting base SB. Movement of the supporting base SB towards the vertical position causes a second end E4 of the first arm 4 to rotate or slide (either automatically via an actuator or manually) towards the ground or surface beneath the supporting base SB until coming into contact with said surface, thereby providing support to the supporting base or structure SB in the vertical position. Furthermore, the first arm 4 includes an extension 7 having a first end that is rotatably connected thereto via one or more screws 6. When the supporting base SB and corresponding solar panel is lifted towards the vertical position, the extension 7 rotates (either automatically via an actuator or manually) towards the horizontal longitudinal beam E1 until a second end of the extension 7 meets this beam E1. The extension 7 can then be locked with the horizontal longitudinal beam E1 via an interlocking mechanism.

In light of the foregoing description, it should be recognized that embodiments in accordance with the present invention can be realized in numerous configurations contemplated to be within the scope and spirit of the claims. Additionally, the description above is intended by way of example only and is not intended to limit the present invention in any way, except as set forth in any future claim.

What is claimed is:

1. A solar panel supporting base configured to allow one or more predominantly horizontal solar panels to be lifted or tilted to a vertical position, comprising:
    at least two perpendicular supporting members;
    one or more horizontal longitudinal beams;
    one or more hinges;
    wherein the first supporting member is taller than the second supporting member;
    wherein the first supporting member is subdivided into a top portion and a bottom portion;
    wherein the bottom portion of the first supporting member is secured to a surface, and one end of the top portion is secured to the bottom portion via one or more screws or fasteners;
    wherein the second supporting member comprises a single structure having a top end and a bottom end, wherein the bottom end is secured to the surface;
    a plurality of angular sections separated by a plurality of central angular sections capable of holding a plurality of solar panels;
    wherein each of the angular section includes a first end and a second end;
    wherein a first angular section and a second angular section are opposite to each other;
    wherein the first end of a third angular section is perpendicularly connected to the first end of the first angular section, and the second end of the third angular section is perpendicularly connected to the first end of the second angular section;
    wherein the first end of a fourth angular section is perpendicularly connected to the second end of the first angular section, and the second end of the fourth angular section is perpendicularly connected to the second end of the second angular section;
    wherein each of the plurality of central angular sections includes opposing ends that perpendicularly intersect with the first angular section and the second angular section;
    wherein the first longitudinal beam is fastened to the top end of the second supporting member via the one or more hinges;
    wherein the second horizontal longitudinal beam is adapted to be fastened on the top portion of the first supporting member;
    a first arm comprising a first end a second end, wherein the first arm is adapted to provide support to the supporting base and corresponding solar panels in a vertical position;
    wherein the first end of the first arm is rotatably connected, via one or more screws, to the one or more of the central angular sections;
    wherein the second end of the first arm is adapted to rotate towards the surface upon movement of the supporting base towards the vertical position;
    wherein the first arm includes an extension having a first end and a second end;
    wherein the first end of the extension is rotatably connected to the first arm; and
    wherein the second end of the extension is adapted to rotate towards the first horizontal longitudinal beam to be locked therein.

2. The solar panel supporting base of claim 1, wherein the top portion is slightly slanted in relation to the bottom portion.

3. The solar panel supporting base of claim 1, wherein the second horizontal longitudinal beam is configured to be secured to the first supporting member.

4. The solar panel supporting base of claim 1, further comprising an interlocking mechanism for locking the extension with the horizontal longitudinal beam.

5. The solar panel supporting base of claim 1, wherein the solar panels comprise a frame, a tempered glass, one or more encapsulants, one or more solar photovoltaic cells, a back sheet, and a junction box.

* * * * *